United States Patent
Kim et al.

(10) Patent No.: US 11,201,666 B2
(45) Date of Patent: Dec. 14, 2021

(54) COMMUNICATION METHOD OF SATELLITE AND GROUND STATION, AND APPARATUSES PERFORMING THE SAME

(71) Applicant: Electronics and Telecommunications Research Institute, Daejeon (KR)

(72) Inventors: Pansoo Kim, Daejeon (KR); Deock Gil Oh, Daejeon (KR); Joon Gyu Ryu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/723,448

(22) Filed: Dec. 20, 2019

(65) Prior Publication Data

US 2020/0343970 A1 Oct. 29, 2020

(30) Foreign Application Priority Data

Apr. 25, 2019 (KR) .................. 10-2019-0048619

(51) Int. Cl.
*H04B 7/204* (2006.01)
*H04B 7/185* (2006.01)

(52) U.S. Cl.
CPC ....... *H04B 7/2041* (2013.01); *H04B 7/18513* (2013.01); *H04B 7/18523* (2013.01); *H04B 7/2048* (2013.01)

(58) Field of Classification Search
CPC ............ H04B 7/18513; H04B 7/18523; H04B 7/2041; H04B 7/2048
See application file for complete search history.

(56) References Cited

U.S. PATENT DOCUMENTS

| 6,115,340 A * | 9/2000 | Van Den Enden .. G11B 7/0045 369/47.28 |
|---|---|---|
| 2007/0150796 A1 | 6/2007 | Kim et al. |
| 2010/0039985 A1 | 2/2010 | Kim et al. |
| 2019/0199428 A1* | 6/2019 | Regunathan ....... H04B 7/18513 |

OTHER PUBLICATIONS

Andrew Kebo et al., "Ambiguity and sidelobe behavior of CAZAC coded waveforms", pp. 99-103, 2007 IEEE Radar Conference, Boston, MA, USA.
Digital Video Broadcasting (DVB): Digital Video Broadcasting (DVB); Second generation framing structure, channel coding and modulation systems for Broadcasting, Interactive Services, News Gathering and other broadband satellite applications; Part 2: DVB-S2 Extensions (DVB-S2X), ETSI EN 302 307-2 V1.1.1, Oct. 2014.

(Continued)

*Primary Examiner* — Minh Trang T Nguyen
(74) *Attorney, Agent, or Firm* — Wlliam Park & Associates Ltd.

(57) ABSTRACT

Disclosed is a communication method of a satellite and a ground station and apparatuses performing the same. The communication method includes transmitting a plurality of frames to a satellite based on a beam hopping time plan (BHTP) of the satellite and a ground station and synchronizing the BHTP based on an index of a frame received through a beam switching window (BSW) allocated to the ground station among the plurality of frames, and an identification value indicating at least one sub-frame included in the frame.

20 Claims, 14 Drawing Sheets

(56) References Cited

OTHER PUBLICATIONS

Jun Zou et al., "Frequency Offset Tolerant Synchronization Signal Design in NB-IoT", Sensors, Nov. 21, 2018, pp. 1-10, 18(11),4077, MDPI.
Kyung-Joong Kim et al., "Low-Density Parity-Check Codes for ATSC 3.0", IEEE Transactions on Broadcasting, Mar. 2016, pp. 189-196, vol. 62, No. 1, IEEE.
Tom Richardson et al., "Design of Low-Density Parity Check Codes for 5G New Radio", Key Technologies for 5G New Radio, IEEE communication magazine, Mar. 2018, pp. 28-34, vol. 56, issue 3.

* cited by examiner

HTS beam cluster

4colors
Bandwidth/Beam : 125MHz, 75MHz
Total capacity : 400MHz (=200*2)

HTS hopping cluster

4colors, 16timeslot (1 BH time plan)
Bandwidth/Beam : 200MHz
Total capacity : 400MHz
(=200*2*10/16+200*2*6/16)

BH time plan

- 720 symbols for SOSF+SFFI
- Format-specific allocation of 612540-720=611820 symbols Frame

300

COMMUNICATION METHOD OF SATELLITE AND GROUND STATION, AND APPARATUSES PERFORMING THE SAME

CROSS-REFERENCE TO RELATED APPLICATION(S)

This application claims the benefit of Korean Patent Application No. 10-2019-0048619, filed on Apr. 25, 2019, in the Korean Intellectual Property Office, the disclosure of which is incorporated herein by reference.

BACKGROUND

1. Field of the Invention

One or more example embodiments relate to a method of communication between a satellite and a ground station, and apparatuses performing the method.

2. Description of the Related Art

In the past, satellite communication provided services limited to a single frequency in a fixed wide coverage, but recently, a data capacity has been increased based on multi-beam satellite payload technologies employing a frequency reuse scheme. For example, satellite repeater technology is a structure for processing a high capacity of data according to an expectation that data traffic may rapidly increase in the era of the fourth industrial revolution. In particular, very high throughput satellite (VHTS) technology has been proposed. The VHTS technology is technology that significantly increases a number of satellite beams by utilizing frequency resources of an ultra-wide band such as a Q/V band as compared to a related art.

However, high throughput satellite (HTS)-based technology has an issue that radio frequency (RF) components for transmission and reception increase according to the number of beams of the satellite communication payload. Also, the HTS-based technology is difficult to deal with flexibly in terms of shifting beam coverages based on data traffic fluctuation once the satellite is launched.

To solve the issues, there has been proposed multi-beam based beam hopping (BH) satellite payload technology. For example, the introduction of an HTS satellite having multi spotbeam has sought to maximize an available resource capacity under a given condition.

Issues about the HTS satellite technology has been continually studied. For example, the issues may include an issue of how to distribute using an optimal scheme such as the number of beams, time, power, and a frequency bandwidth of the satellite based on variable traffic requirements and non-uniform traffic patterns generated between different beams and different times, under different times and spaces.

Recently, as beam hopping satellites have attracted attention, they are seen as techniques to effectively cope with the most uneven resource demand in terms of power, space, and time.

The beam hopping satellite may be technology that can solve the issues about the HTS satellite through flexible bandwidth, power, and time allocations.

SUMMARY

An aspect provides technology for synchronizing beam hopping time plans (BHTPs) between a satellite and a ground station using a network synchronization-dedicated super frame (SF)

Another aspect also provides technology for tracking an out-of-sync of a synchronization-acquired BHTP during data transmission performed using an SF for data transmission.

According to an aspect, there is provided a communication method including transmitting a plurality of frames to a satellite based on a beam hopping time plan (BHTP) of the satellite and a ground station and synchronizing the BHTP based on an index of a frame received through a beam switching window (BSW) allocated to the ground station among the plurality of frames, and an identification value indicating at least one sub-frame included in the frame.

The synchronizing may include determining whether the frame is a network synchronization-dedicated super frame (SF) structure for synchronizing the BHTP, extracting, when the frame is the network synchronization-dedicated SF structure, an index and an identification value of a sub-frame detected from a plurality of sub-frames included in the frame, determining a time offset between the satellite and the ground station based on the index and the identification value of the detected sub-frame, and synchronizing the BHTP based on the time offset.

The frame may include the plurality of sub-frames and dummy symbols corresponding to a protection section required in BSW transition.

Each of the plurality of sub-frames may include a start of super frame (SOSF), a super frame format indicator (SFFI), and a counter field in which an identification value of the corresponding sub-frame is stored.

The SOSF of each of the plurality of sub-frames may include a same frame index.

The SFFI may include SF format information indicating that the frame is the network synchronization-dedicated SF structure for synchronizing the BHTP.

The counter field may include a first bit representing a total number of frames of the plurality of frames and a second bit representing an identification value of the corresponding sub-frame.

The communication method may further include transmitting a plurality of data frames including data to the satellite based on a BHTP of which a synchronization is acquired.

Each of the plurality of data frames may include fixed dummy symbols and a variable dummy frame.

The dummy symbols and the variable dummy frame may determine a beam switching time interval required in BSW transition in a frame structure of each of the plurality of data frames.

The variable dummy frame may be changed to determine the beam switching time interval using one of a plurality of bundle frames included in a data field of each of the plurality of data frames.

Number information of the variable dummy frame may be included in PLS or P2 included in the data field.

According to another aspect, there is provided a communication apparatus including a transceiver configured to transmit a plurality of frames to a satellite based on a BHTP of the satellite and a ground station and a controller configured to synchronize the BHTP based on an index of a frame received through a BSW allocated to the ground station among the plurality of frames, and an identification value indicating at least one sub-frame included in the frame.

The controller may be configured to determine whether the frame is a network synchronization-dedicated SF structure for synchronizing the BHTP, extract an index and an identification value of a sub-frame detected from a plurality of sub-frames included in the frame when the frame is the network synchronization-dedicated SF structure, determine a time offset between the satellite and the ground station based on the index and the identification value of the detected sub-frame, and synchronize the BHTP based on the time offset.

The frame may include the plurality of sub-frames and dummy symbols corresponding to a protection section required in BSW transition.

Each of the plurality of sub-frames may include an SOSF, an SFFI, and a counter field in which an identification value of the corresponding sub-frame is stored.

The SOSF of each of the plurality of sub-frames may include a same frame index.

The SFFI may include SF format information indicating that the frame is the network synchronization-dedicated SF structure for synchronizing the BHTP.

The counter field may include a first bit representing a total number of frames of the plurality of frames and a second bit representing an identification value of the corresponding sub-frame.

The controller may be configured to transmit a plurality of data frames including data to the satellite based on a BHTP of which a synchronization is acquired.

Each of the plurality of data frames may include fixed dummy symbols and a variable dummy frame.

The dummy symbols and the variable dummy frame may determine a beam switching time interval required in BSW transition in a frame structure of each of the plurality of data frames.

The variable dummy frame may be changed to determine the beam switching time interval using one of a plurality of bundle frames included in a data field of each of the plurality of data frames.

Number information of the variable dummy frame may be included in PLS or P2 included in the data field.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
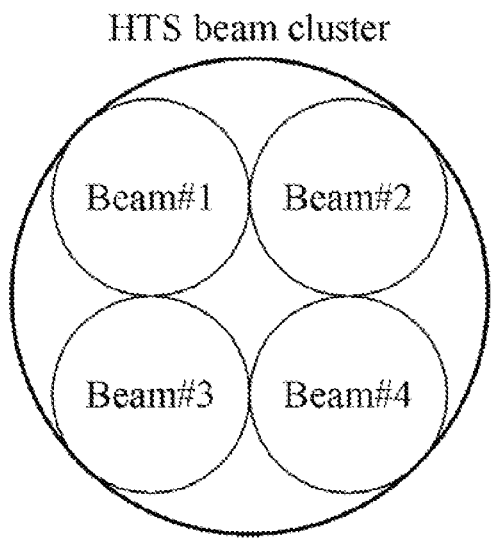
FIG. 1 illustrates a comparison between a high throughput satellite (HTS) communication system and a beam hopping (BH) satellite communication system.
Figure 1:
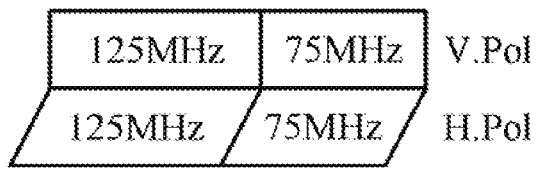
Figure 1:
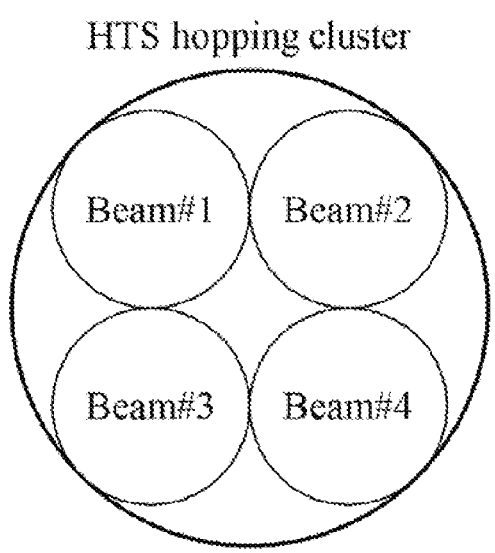
Figure 1:
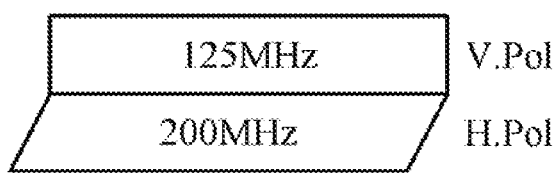
Figure 1:
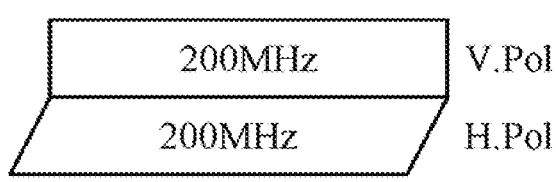
Figure 1:
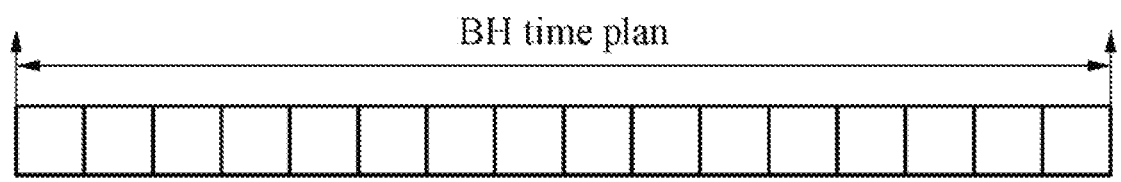

Hereinafter, example embodiments will be described in detail with reference to the accompanying drawings. It should be understood, however, that there is no intent to limit this disclosure to the particular example embodiments disclosed. On the contrary, example embodiments are to cover all modifications, equivalents, and alternatives falling within the scope of the example embodiments.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Regarding the reference numerals assigned to the elements in the drawings, it should be noted that the same elements will be designated by the same reference numerals, wherever possible, even though they are shown in different drawings. Also, in the description of example embodiments, detailed description of well-known related structures or functions will be omitted when it is deemed that such description will cause ambiguous interpretation of the present disclosure.

FIG. 1 illustrates a comparison between a high throughput satellite (HTS) communication system and a beam hopping (BH) satellite communication system.

The HTS satellite communication system and the BH satellite communication system may be the same in total data capacity and different in system efficiency and flexibility of resource allocation.

In terms of the same and adjacent channel interference and power consumption due to a use of multiple carriers, the HTS satellite communication system may be less in system efficiency than the BH satellite communication system.

Also, a flexibility of resource allocation of the HTS satellite communication system may be reduced.

Accordingly, a new terrestrial network design is required for the BH satellite communication system in contrast to a typical single environment or environment of the HTS satellite communication system.

A typical very small aperture terminal (VSAT) communication system provides a reference clock in a network synchronization process of a gateway of a ground station, so that a user terminal performs communication through a synchronization with the reference clock.

In the BH satellite communication system, a network synchronization between the gateway and the user terminal may proceed as the same as before.

However, since the BH satellite communication system performs beam switching in a BH satellite (or, a BH satellite repeater), the network synchronization between the BH satellite and the gateway may be required by priority. For example, to maintain the network synchronization, the gateway may require that a beam is to be allocated to the user terminal at preset intervals.

That is, the BH satellite communication system may be a communication system that transmits data traffic to each user terminal while the network synchronization between the BH satellite and the gateway of the ground station is stably maintained.

Particularly, the stable maintenance of the network synchronization in the BH satellite communication system may be an important factor in a system.

Figure 2:
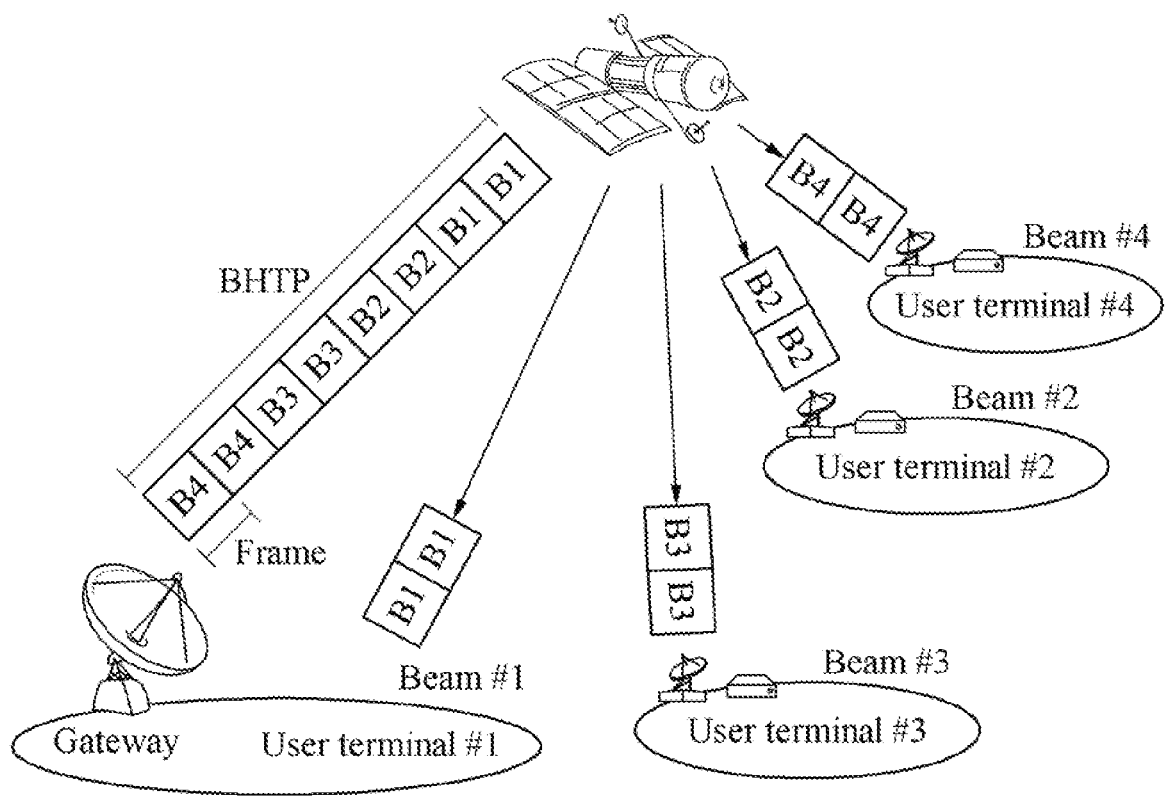
FIG. 2 illustrates a configuration of a BH satellite communication system.

FIG. 2 illustrates a configuration of a BH satellite communication system.

The BH satellite communication system may include a gateway, a BH satellite, and a user terminal.

The BH satellite communication system may transmit data to the user terminal through the BH satellite (or a beam hopping satellite). In this instance, the gateway may be included in a ground station. The data may be in a form of time division multiplexing (TDM).

The gateway may transmit data including a plurality of frames to the BH satellite based on a beam hopping time plan (BHTP). The plurality of frames may be super frames (SFs) of the DVB-S2x standard.

Thereafter, the BH satellite may perform beam hopping or beam switching in a predetermined time through a BH satellite payload based on a beam switching window (BSW) corresponding to the BHTP. A beam may be either a fixed beam having a fixed bandwidth (or frequency range) or a similar beam similar to the fixed beam. The satellite payload may be a regenerative type or a bent-pipe type. Hereinafter, for ease of description, it is assumed that the satellite payload is the bent-pipe type and capable of performing a beam hopping function (or beam switching function).

The BH satellite communication system may transmit a frame to the user terminal located at each beam.

The BHTP may vary as a transmission time period and a time schedule of a beam, a coverage, and a frame.

For example, as illustrated in FIG. 2, the BHTP may be a time period having eight frames including two B1 frames, two B2 frames, two B3 frames, and two B4 frames. In this example, the BHTP may be a time schedule in which B1 is transmitted to a coverage including a user terminal #1 through a beam #1, B2 is transmitted to a coverage including a user terminal #2 through a beam #2, B3 is transmitted to a coverage including a user terminal #3 through a beam #3, and B4 is transmitted to a coverage including a user terminal #4 through a beam #4 in a sequence of B1, B2, B3, and B4, and may vary based on a network operator.

The BSW may be a time interval in which the BH satellite opens a beam for a coverage including a user based on the BHTP to transmit a frame allocated to the user by hopping the beam based on the BHTP. The BSW may be a time interval corresponding to a length of a single frame or a plurality of frames. The BSW may include a plurality of BSWs corresponding to a plurality of coverages.

The gateway may be aware of the BHTP. Also, the BHTP may be shared by the gateway and the BH satellite. That is, the gateway and the BH satellite may be synchronized with each other with respect to the BHTP.

The gateway may synchronize the BHTP between the gateway and the satellite through a network synchronization process including an acquisition process and a tracking process.

The acquisition process may be a process of synchronizing the BHTP using feedback reception data. For example the gateway may transmit data in a form of a continuous data stream. Thereafter, the gateway and the user terminal #1 may receive a beam #1 signal and receive the B1 frame (or B1 data).

Accordingly, the gateway may perform the network synchronization process based on the feedback reception data.

The tracking process may be a process of performing a micro-synchronization on a change such as a timing drift after a coarse timing synchronization of the BHTP, and then verifying an alignment of a final BHTP.

The network synchronization process may be performed in a system initialization state. Also, the network synchronization may be stably maintained during system operation and maintained without suspension even when the BHTP is changed.

Other than the network synchronization, a data transmission process may be similar to a typical process. For example, a data transmission scheme in the BH satellite communication system may be similar to a typical transmission scheme of the HTS satellite communication system. The data transmission scheme of the HTS satellite communication system and the BH satellite communication system may be a scheme of transmitting data by appropriately distributing a time, a frequency, and power in consideration of a channel environment and a requirement for data traffic generated in each beam at which the user terminal is located.

Figure 3:
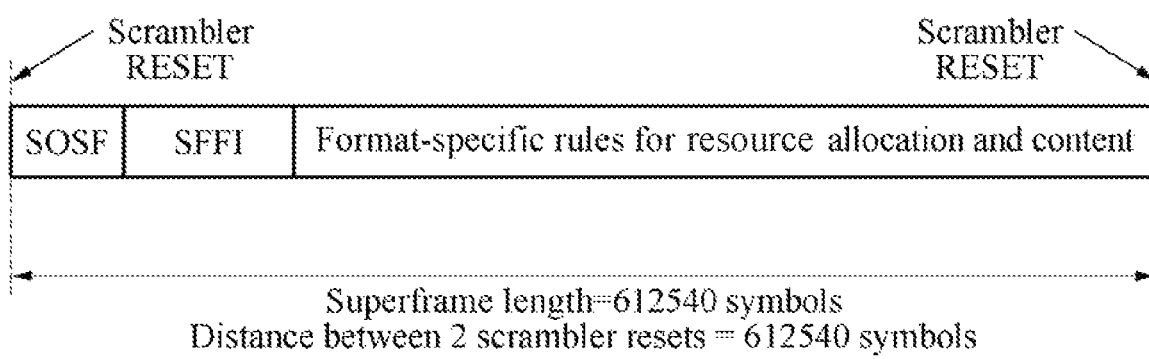
FIG. 3 illustrates an example of a frame of FIG. 2.

FIG. 3 illustrates an example of a frame of FIG. 2.

A frame of FIG. 2 may be an SF identical to a frame structure of FIG. 3. The frame structure of FIG. 3 is a digital video broadcasting-satellite $2^{nd}$ generation extension super frame (DVB-S2x SF) structure applicable to a BH satellite, which is an SF structure described in Annex E of the DVB-S2x standard (ETSI EN 302 307 part 2).

The DVB-S2x SF may be configured as 16 different SF structures. For example, an SF-1 format is a structure that does not support a BH function and an SF-2 format is a structure that supports the BH function. The beam switching of the SF-2 format and SF-3 format structures is possible within a predetermined time. The beam switching of an SF-4 format is possible in a form of a dummy frame of a type B. An SF-5 format through an SF-15 format are undefined formats.

A single SF of the DVB-S2x standard may have a frame length corresponding to a 612,540-symbol length (or symbol number) and consist of a common section and a non-common section for all formats.

For example, a common section may have a 720-symbol length and may include a start of super frame (SOSF) having a 270-symbol length and a super frame format indicator (SFFI) having a 450-symbol length.

The SOSF may be a section including information indicating a start of the SF. The SOSF may be generated (or configured) based on a known sequence shared between transmission and reception for detecting an index of a frame. The sequence may be diversified and transmitted as a different pattern based on 256 SOSF indices (or walsh hadamard (WH) signature).

The SFFI may be a section including 4-bit SF format information.

The non-common section may be in a configuration varying for each SF format.

Figure 4:
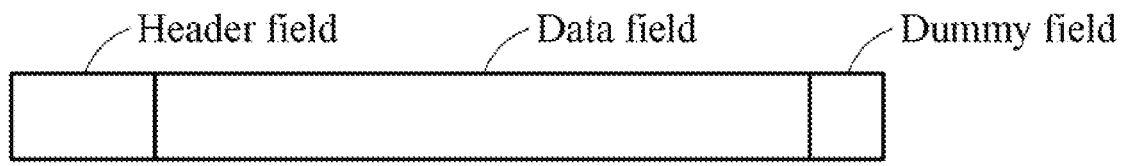
FIG. 4 illustrates an example for explaining a frame of FIG. 3.
Figure 5:
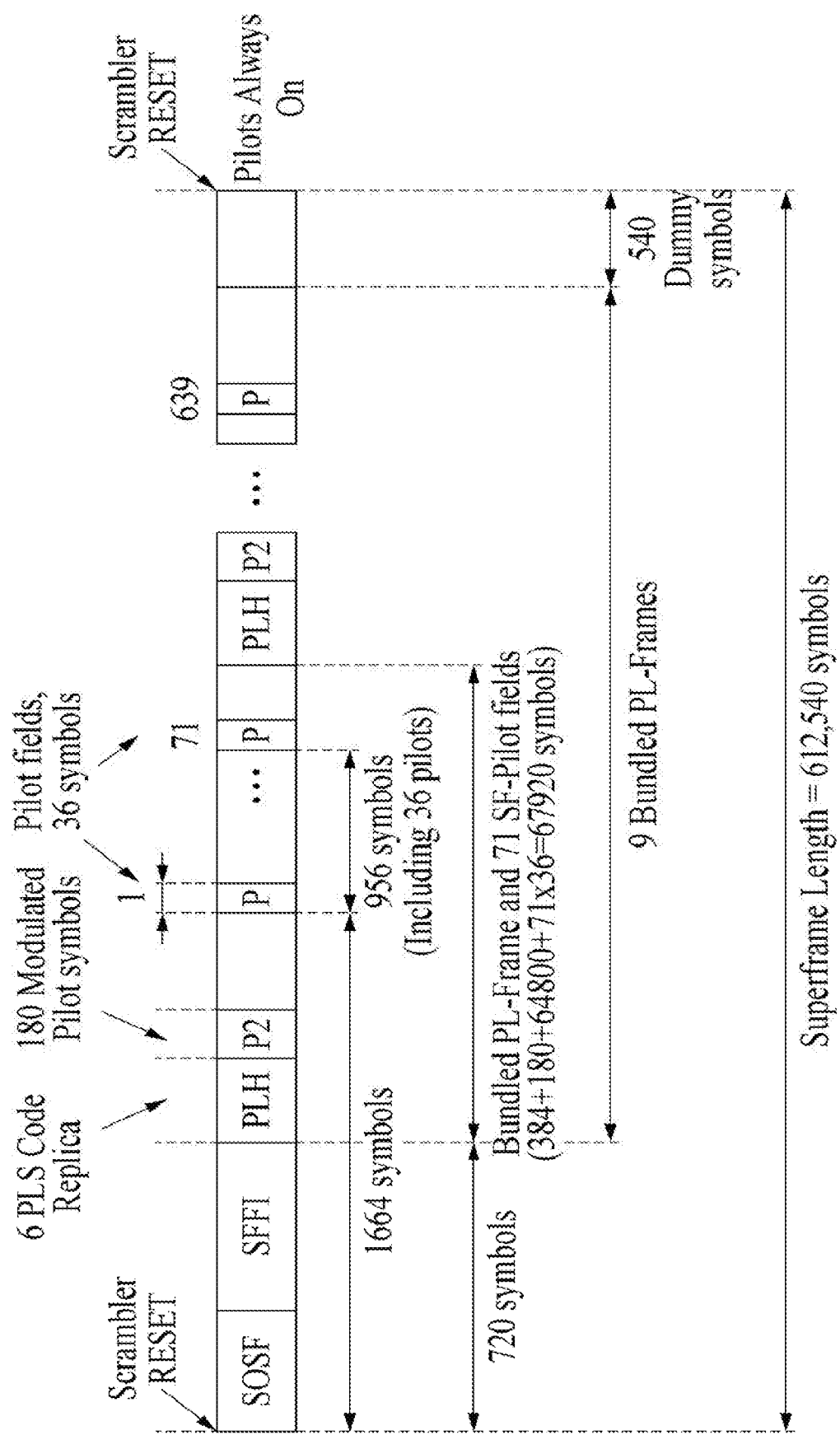
FIG. 5 illustrates another example for explaining the frame of FIG. 3.
Figure 6:
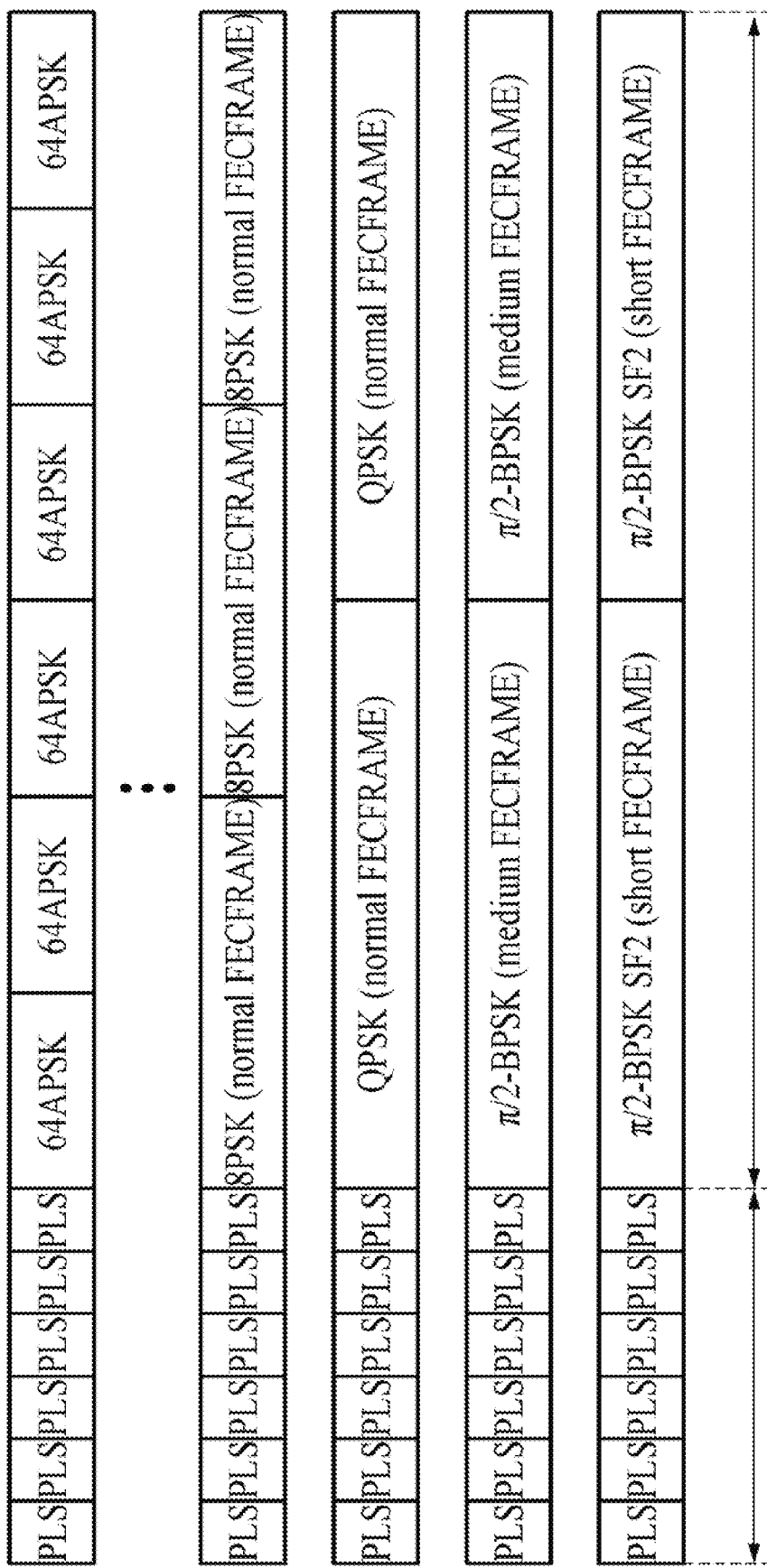
FIG. 6 illustrates an example for explaining a frame of FIG. 4.

FIG. 4 illustrates an example for explaining a frame of FIG. 3, FIG. 5 illustrates another example for explaining the frame of FIG. 3 and FIG. 6 illustrates an example for explaining a frame of FIG. 4.

Referring to FIGS. 4 through 6, a DVB-S2x SF may include a header field corresponding to a common section and a dummy field and a data field corresponding to a non-common section.

For example, the header field may include information on an index of a frame. The information on the index of the frame may be information for detecting the index of the frame. The data field may include data. The data may be multiplexed data. The dummy field may be a protection section of a transition period required in BSW transition.

As illustrated in FIG. 5, a DVB-S2x SF-2 format structure may include an SOSF corresponding to a common section, an SFFI, dummy symbols and a plurality of bundle frames corresponding to a non-common section.

For example, the SOSF and the SFFI may be a header field, the plurality of bundle frames may be a data field, and the dummy symbols may be a dummy field. The plurality of bundle frames may be a plurality of bundled physical layer (PL)-frames. A single frame may consist of nine bundled PL frames. The plurality of bundled PL frames may include a physical layer header (PLH), P2, data, and a pilot (P). Each of the nine bundled PL frames may include 67,920 symbols. The dummy symbols may have a length of 540 symbols.

As illustrated in FIG. 6, to maintain a uniform PL frame irrespective of a modulation scheme, the SF-2 format and the SF-3 format of the DVB-S2x SF may be configured in a form of a bundled PL frame along which a plurality of frames follows. Thus, the SF-2 format and the SF-3 format of the DVB-S2x SF may have a structure inefficient in terms of flexibility.

However, when a frame length is not uniform, the SF-2 format and the SF-3 format of the DVB-S2x SF may have a difficulty in synchronizing of scrambling sequence application for the same channel interference alleviation.

Figure 7:
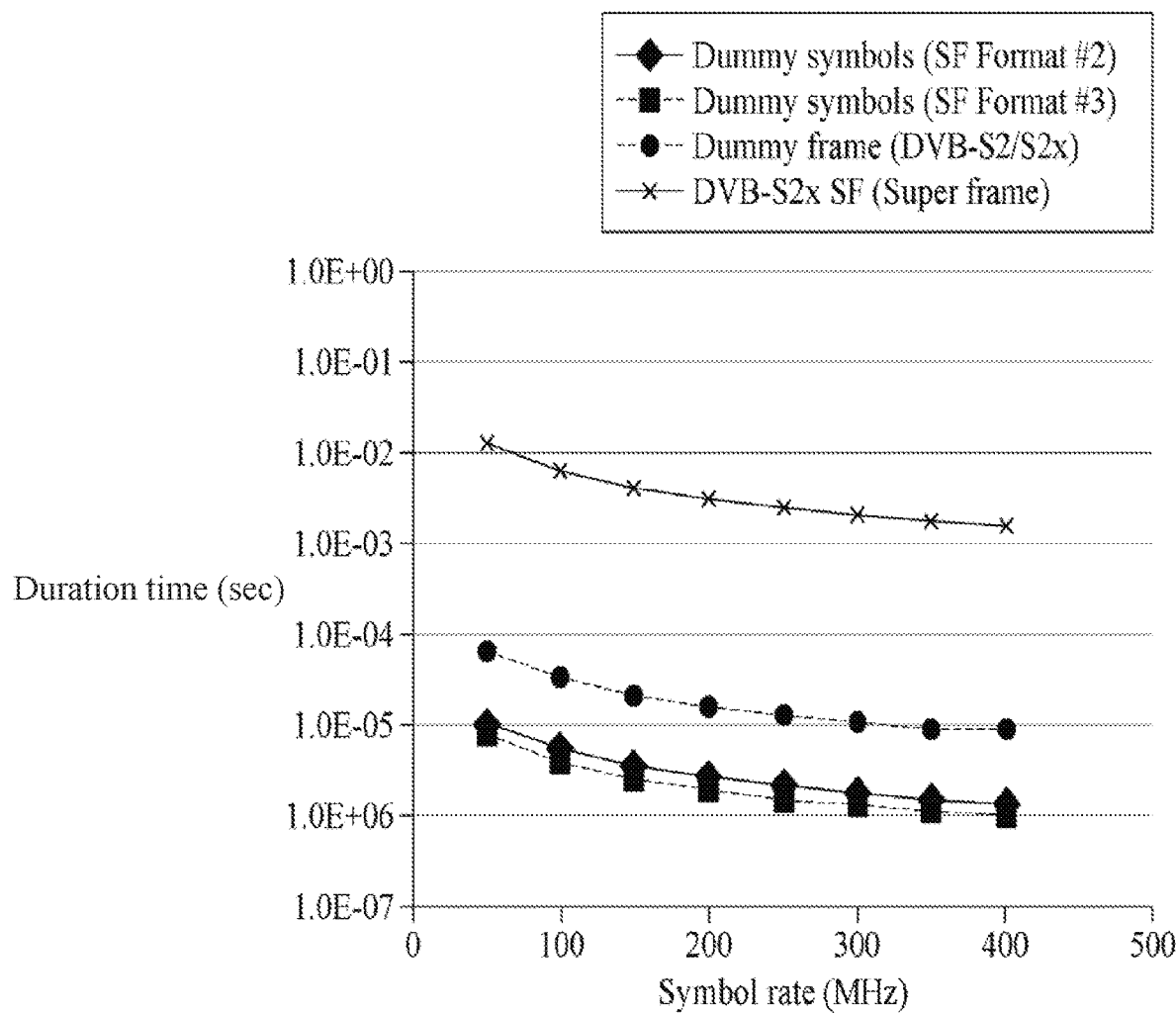
FIG. 7 illustrates a frame time length based on a symbol speed for the frame of FIG. 3.

FIG. 7 illustrates a frame time length based on a symbol speed for the frame of FIG. 3.

The DVB-S2x SF may have a small frame time length when a symbol speed is high and may have a long frame time when the symbol speed is low. Thus, the DVB-S2x SF may have restrictions on a service affected by a latency (or a time delay).

The SF-2 format of the DVB-S2x SF may have a 540-symbol length of fixed dummy symbols and the SF-3 format of the DVB-S2x SF may have a 396-symbol length of fixed dummy symbols. When the symbol speed is assumed as 100 Mbaud, the symbol speed of the SF-2 format of the DVB-S2x SF may be 5.4 usec and the symbol speed of the SF-3 format of the DVB-S2x SF may be 3.96 usec.

The SF-2 format and the SF-3 format of the DVB-S2x SF may be SF structures efficient in beam hopping (or beam switching) only for a repeater having an ultra-wide bandwidth such as a Ka-band satellite repeater.

When the symbol speed is low, the SF-2 format and the SF-3 format of the DVB-S2x SF may have an inefficient beam hopping time (or beam switching time) due to significantly long dummy symbols.

That is, the SF-2 format and the SF-3 format of the DVB-S2x SF may be reduced in transmission efficiency due to the length of dummy symbols.

Figure 8:
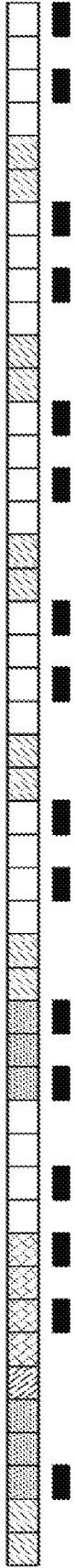
FIG. 8 illustrates an example of explaining a typical beam hopping time plan (BHTP) synchronization method.
Figure 9:
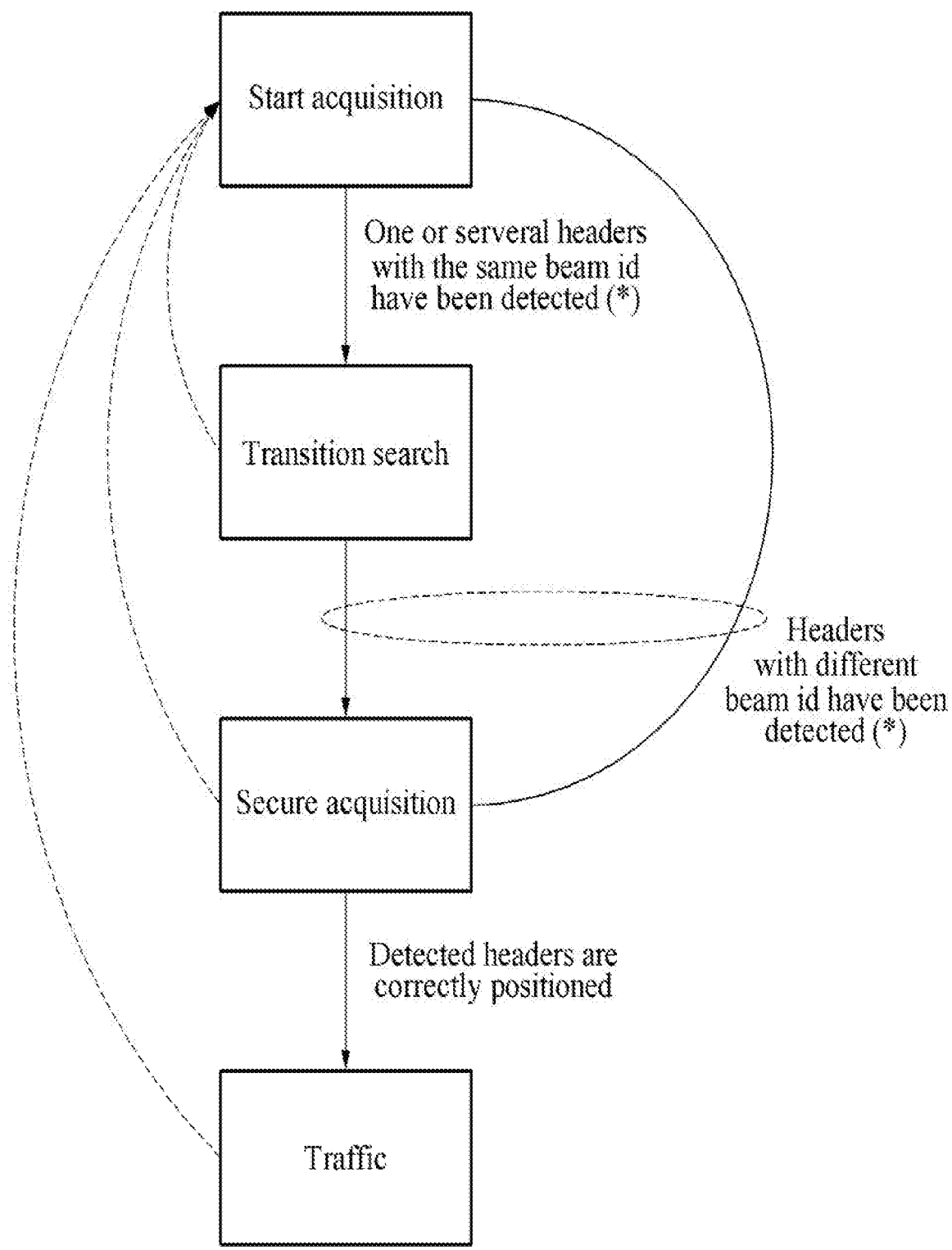
FIG. 9 is a flowchart illustrating the BHTP synchronization method of FIG. 8.

FIG. 8 illustrates an example of explaining a typical BHTP synchronization method and FIG. 9 is a flowchart illustrating a BHTP synchronization method of FIG. 8.

FIG. 8 illustrates a case in which a number of beam coverages or beam indices (or frame indices) is 16 and a length of BHTP has a length of 47 SFs.

When it is assumed that a section in which a beam is opened between a gateway and a BH satellite is a section corresponding to a beam index 2, an initial timing uncertainty may be the length of 47 SFs, which is significantly large.

To solve a problem of the significantly large initial timing uncertainty, a method of allocating maximum 256 different WH signatures to an SOSF through an index mapping corresponding to each beam in the gateway may be employed. The WH signature allocating method may acquire a network synchronization start point from an index from which a transceiver of the gateway acquires a largest amount of energy through cross-correlation.

Referring to FIG. 9, the gateway may enter a network synchronization acquisition process (or synchronization process) through a process of verifying (or transitioning) whether a beam index is changed immediately after determining whether to acquire energy in the SOSF only once (for example, a minimum SF length of 1).

However, the above-described scheme may have a problem that a receiver complexity increases based on the number of beams in a transceiver of the gateway. Also, a timing acquisition time may be delayed due to a timing ambiguity when a large number of beams have the same BSW length.

Also, the DVB-S2x SF may take a long time for initial network synchronization between the BH satellite and a terrestrial model device when a BHTP value is relatively large. Accordingly, when the DVB-S2x SF fails to maintain the network synchronization, a time for reacquiring the network synchronization may increase.

The SF-2 format and the SF-3 format of the DVB-S2x SF may be increased from a dummy frame 3330-symbol length of a general DVB-S2 standard to at least a 64,800-symbol length and a 16,200-symbol length. In this example, a transmission efficiency per bandwidth may decrease in the SF-2 format and the SF-3 format of the DVB-S2x SF.

Since a low density parity check code (LDPC) symbol length used in the DVB-S2x SF uses a symbol with lengths of 64 k bits and 16 k bits, a bundle frame length (or an LDPC codeword length) of the DVB-S2x SF may be at least 64,800-symbol length (or 64,800 bits) and 16,200-symbol length (or 16,200 bits). Accordingly, the DVB-S2x SF may have a problem of transmission delay along with a satellite round trip delay (RTD) and a problem of requiring a sufficient buffer length for scheduling in transmission.

The DVB-S2x SF may have a problem that an influence on a Doppler frequency error occurs when the BH technique is used for a low orbit satellite instead of a geostationary satellite. For example, in a Doppler frequency error environment, a WH signature may have a problem in that a correlation characteristic is degraded in performance due to a decrease in signal caused by phase rotation of the signal.

For the DVB-S2x SF, a very low VL SNR support for services such as the internet of thing (IoT) may be increased.

The SF-2 format and the SF-3 format of the DVB-S2x SF may have a problem that they do not have a separate signaling transmission bit for beam ID or coverage ID information.

When the user terminal is mounted in an aircraft, when the user terminal has high mobility characteristics, or a beam handover is considered in consideration of a case in which a satellite moves such as a low earth orbit (LEO), the beam ID information may be useful information. Also, when an adjacent channel interference avoidance is considered, the beam ID information may be useful information.

Therefore, to solve the aforementioned problems, the network synchronization-dedicated SF may be used.

Hereinafter, example embodiments of synchronizing BHTPs using a network synchronization-dedicated SF and tracking an out-of-sync of a synchronization-acquired BHTP using an SF for data transmission will be described.

Figure 10:
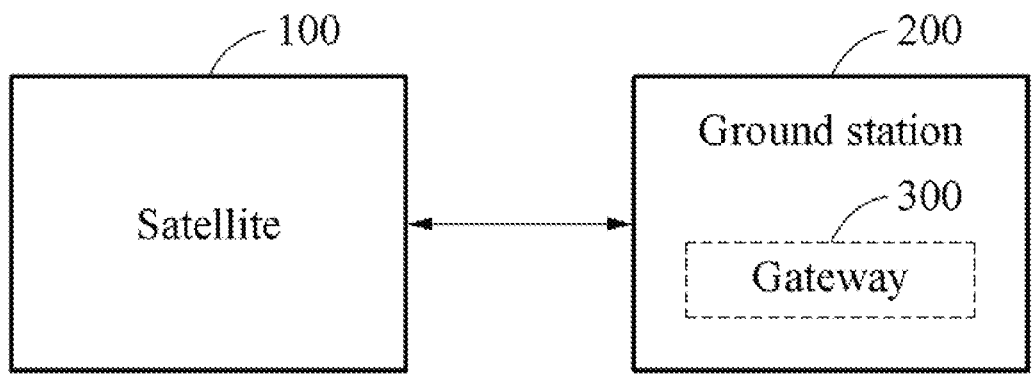
FIG. 10 is a block diagram illustrating a communication system according to an example embodiment.

FIG. 10 is a block diagram illustrating a communication system according to an example embodiment.

A communication system 10 may include a satellite 100 and a ground station 200.

Since the satellite 100, the ground station 200, and the gateway 300 are identical or similar to the satellite, the ground station, and the gateway of FIG. 2, repeated description will be omitted.

To synchronize BHTPs between the satellite 100 and the ground station 200, the gateway 300 may synchronize the BHTPs using a network synchronization-dedicated SF. Through this, the gateway 300 may more accurately provide a communication service by synchronizing the BHTPs while preventing an increase in hardware complexity. Also, to track an out-of-sync of the BHTP during data transmission, the gateway 300 may track an out-of-sync of the synchronization-acquired BHTP using an SF for data transmission used to define a variable dummy frame. Through this, a beam switching time may be increased. Based on the increased beam switching time, whether the BHTP is out of synchronization may be more accurately determined, so that the communication service is more accurately provided.

Figure 11:
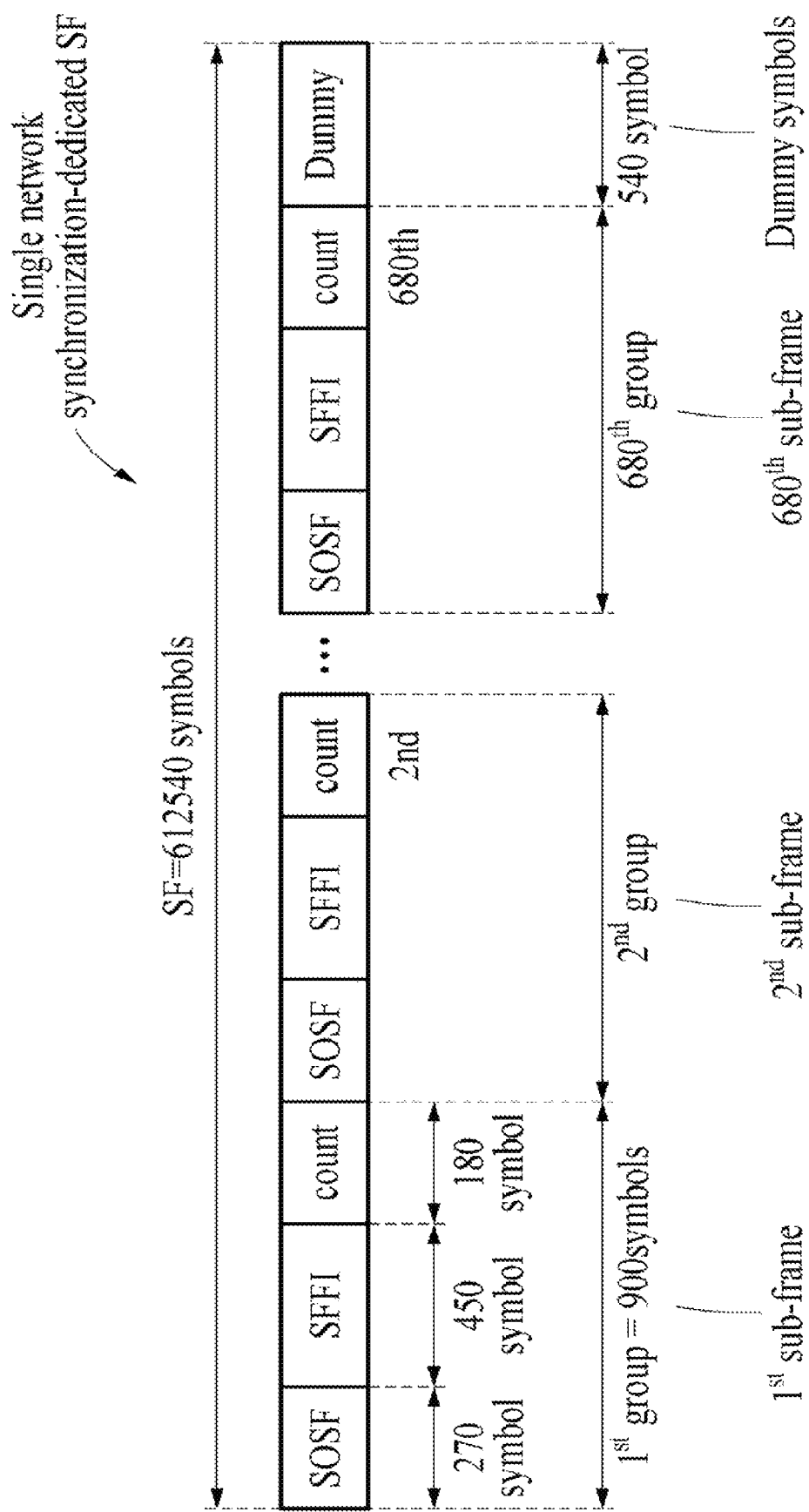
FIG. 11 illustrates a network synchronization-dedicated super frame (SF) according to an example embodiment.

FIG. 11 illustrates a network synchronization-dedicated SF according to an example embodiment.

A network synchronization-dedicated SF may be an SF for synchronizing BHTPs between the satellite 100 and the ground station 200. The network synchronization-dedicated SF may have a length of 612,540 symbols.

The network synchronization-dedicated SF may include a plurality of sub-frames and dummy symbols.

For example, a plurality of sub-frames included in a single network synchronization-dedicated SF may be grouped (or windowed) in units of 900 symbols so as to be provided as a first sub-frame through a $680^{th}$ sub-frame. Indices of the first sub-frame through the $680^{th}$ sub-frame may be the same. The dummy symbols may have a length of 540 symbols and may be a protection section required in BSW transition.

Each of the plurality of sub-frames may include an SOSF and an SFFI corresponding to a header field, and a counter field.

The SOSF of each of the plurality of sub-frames may include the same frame index. The SOSF may have a length of 270 symbols.

The SFFI may include SF format information indicating that a frame is in a network synchronization-dedicated SF structure. The SFFI may have a length of 450 symbols.

The counter field may include an identification value (or group value, counter information) representing each of the plurality of sub-frames. The counter field may have a length of 180 symbols.

The counter field may be encoded using a scheme such as physical layer signaling (PLS) encoding and consist of 16 bits including first bits and second bits.

The first bits may indicate a total number of frames of a plurality of transmitted frames. The first bits may be upper six bits among the 16 bits.

Figure 12:
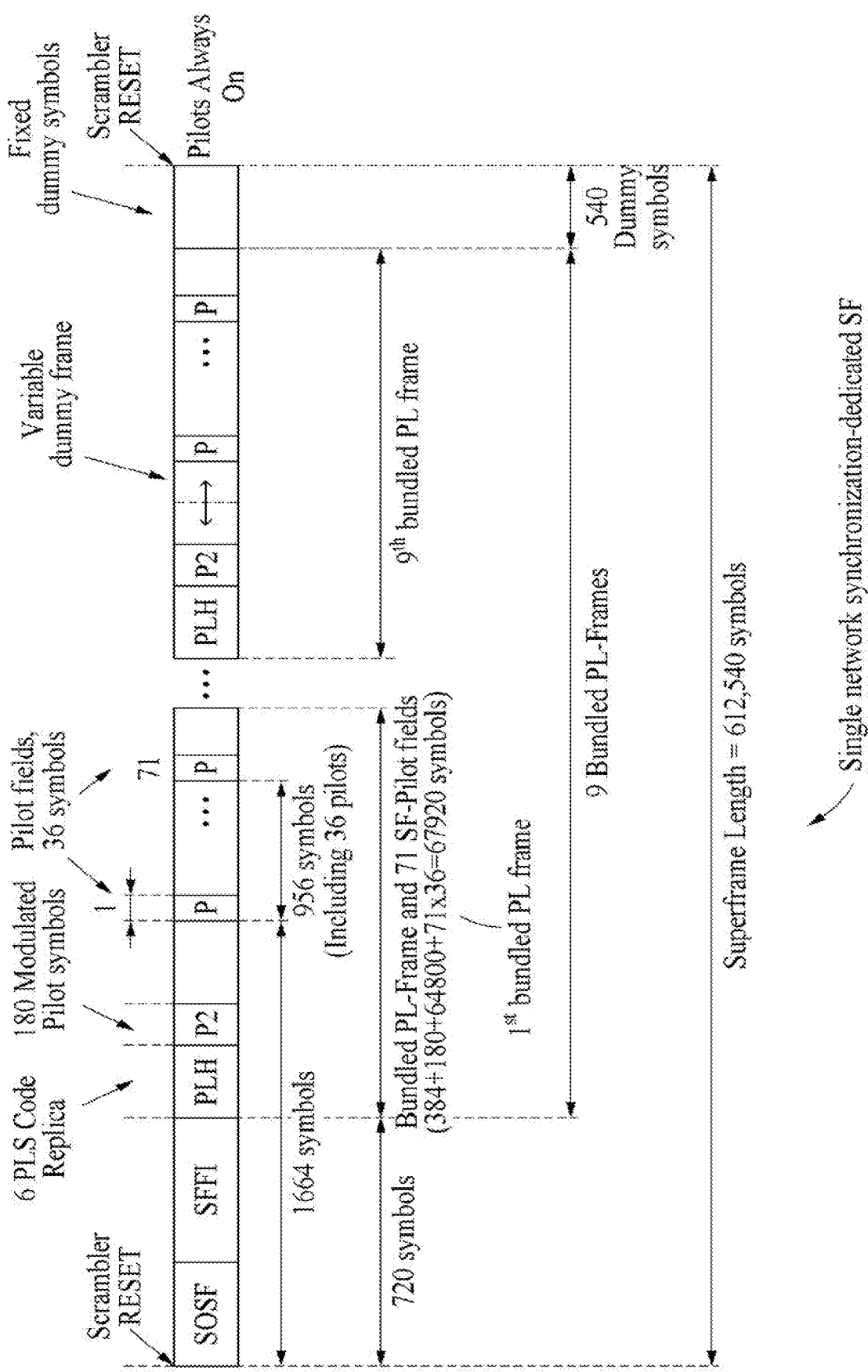
FIG. 12 illustrates an SF for data transmission according to an example embodiment.

The second bit may indicate an identification value of a sub-frame including the counter field. The second bits may be lower 10 bits among the 16 bits. The second bit may indicate the identification value of the sub-frame among identification values of No. 1 through 680. For example, an identification value of the second bit of the counter field included in the first sub-frame may indicate No. 1. Also, an identification value of the second bit of the counter field included in the $680^{th}$ sub-frame may indicate No. 680. FIG. 12 illustrates an SF for data transmission according to an example embodiment.

An SF for data transmission may be an SF for transmitting data to a user terminal after BHTPs between the satellite 100 and the ground station 200 are synchronized. Since the SF for data transmission is identical or similar to the SF of FIGS. 4 through 6, repeated description will be omitted.

The SF for data transmission may further include a variable dummy frame in addition to fixed dummy symbols. Since the dummy symbols are identical or similar to the dummy symbols of FIGS. 4 and 5, repeated description will be omitted.

The dummy symbols and the variable dummy frame may determine a beam switching time interval required in BSW transition in a frame structure of the SF for transmission. The beam switching time interval may be a section included in the frame structure to consider a switching time of a beam.

The variable dummy frame may be changed to determine the beam switching time interval using one of a plurality of bundle frames included in a data field of the SF for data transmission. For example, as illustrated in FIG. 12, the variable dummy frame may be defined as a whole or partial section of a last bundle frame among the plurality of bundle frames (a first bundle frame through a ninth bundle frame). That is, the variable dummy frame may be variably formed in an entire section of a single bundle frame.

Number information of the variable dummy frame may be included in PLS or P2 included in the data field. For example, the number information of the variable dummy frame may be included in 6 PLS and 4 PLS.

For example, the SF-2 format and the SF-3 format of the DVB-S2x SF may not have a definition of a dummy frame. Also, in the DVB-S2/S2x standard, it is indicated that a length of the dummy frame is a length of 3330 symbols.

When a single bundle frame has a length of 64,800 symbols, a number of variable dummy frames may be 20. When a single bundle frame has a length of 16,200 symbols, the number of variable dummy frames may be 5.

As such, through the variable dummy frame, the SF for data transmission may include a beam switching time interval increased in comparison to a typical beam switching time interval of the DVB-S2x SF.

The SF for data transmission may construct a bundle frame in a form of using 2048 bits, 4096 bits, and 8192 bits as bundle frame lengths (or LDPC codeword lengths) and shortening a residue.

Also, to solve a problem that an influence on a Doppler frequency error occurs, the SF for data transmission may transform SOSF and SFFI symbols into a chirp signal, a Zadoff-Chu sequence, and a Bjorck sequence, thereby achieving robustness to a frequency error.

Also, to expand a VL SNR support for a service such as the IoT, the SF for data transmission may require a performance improvement through a support at an LDPC low code rate (for example, 2/15, 3/15, etc.).

To improve the performance at the LDPC low code rate, the SF for data transmission may use an LDPC symbol having a single parity check matrix instead of a parity check matrix and a dual diagonal matrix.

Figure 13:
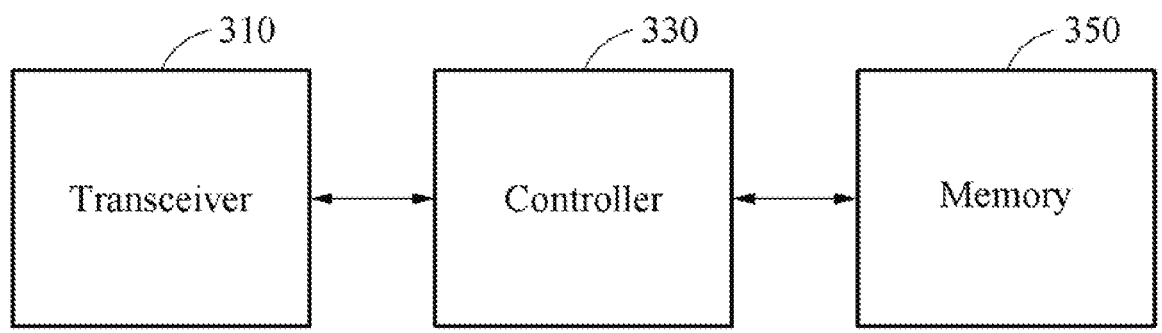
FIG. 13 is a block diagram illustrating a gateway of FIG. 10.

Also, beam ID information may be added to P2 of the SF for data transmission such that the SF for data transmission uses the beam ID information. For example, the beam ID information may be one of beam ID information encoded through the PLS encoding to have 16 bits and beam ID information encoded through the PLS encoding to have 8 bits. FIG. 13 is a block diagram illustrating a gateway of FIG. 10.

A gateway 300 may include a transceiver 310, a controller 330, and a memory 350.

The transceiver 310 may transmit and receive a plurality of frames and a plurality of data frames under the control of the controller 330. The plurality of frames and the plurality of data frames may include a frame index based on a BHTP. For example, each of the plurality of frames may include a different or same index.

The memory 350 may store instructions (or program) to be executed by the controller 330. For example, the instructions may include instructions for executing an operation of the controller 330.

The controller 330 may control an overall operation of the gateway 300. For example, the controller 330 may control each component (310 and 350) of the gateway 300.

The controller 330 may synchronize BHTPs based on an index of a network synchronization-dedicated SF and an identification value of at least one sub-frame included in the network synchronization-dedicated SF.

The controller 330 may transmit (or send) the plurality of frames to the satellite 100 through the transceiver 310 based on the BHTP. The plurality of frames may be network synchronization-dedicated SFs.

Thereafter, the controller 330 may synchronize BHTPs by adjusting a time offset between the satellite 100 and the ground station 200 based on an index of a frame received through a BSW allocated to the ground station 200 among the plurality of frames and an identification value of at least one sub-frame included in the frame. In this example, the identification value of the at least one sub-frame may be an identification value representing the at least one sub-frame. The time offset may be a time error (or time deviation) between a BHTP of the satellite 100 and a BHTP of the ground station 200, and may be a BHTP timing error between the satellite 100 and the ground station 200.

For example, after transmitting the plurality of frames, the controller 330 may measure average noise power and determine whether the frame is received. When a signal level corresponding to about twice the average noise power is measured, the controller 330 may determine that the frame is received.

The controller 330 may determine whether the received frame is in a network synchronization-dedicated SF structure for synchronizing the BHTPs between the satellite 100 and the ground station 200.

For example, the controller 330 may determine whether the received frame includes SF format information indicating that the frame is in the network synchronization-dedicated structure.

When the received frame includes the SF format information indicating that the frame is in the network synchronization-dedicated structure, the controller 330 may determine that the received frame is the network synchronization-dedicated SF.

When the received frame does not include the SF format information indicating that the frame is in the network synchronization-dedicated structure, the controller 330 may determine that the received frame is not the network synchronization-dedicated SF.

When the received frame is in the network synchronization-dedicated SF structure, the controller 330 may extract an index and an identification of a sub-frame detected from a plurality of sub-frames included in the received frame.

The controller 330 may detect at least one received sub-frame from the plurality of sub-frames.

Thereafter, the controller 330 may extract an index and an identification value of the detected sub-frame.

For example, when an entire section of a header field of the detected sub-frame is received, the controller 330 may extract an index of the detected sub-frame. The index of the detected sub-frame may represent a frame received from a plurality of network synchronization-dedicated SFs.

The controller 330 may extract an identification value of a sub-frame indicated by a counter field detected first from counter fields of the detected sub-frames. The identification value of the sub-frame may represent a receiving position of the received frame among the plurality of network synchronization-dedicated SFs.

The controller 330 may determine the time offset between the satellite 100 and the ground station 200 based on the index and the identification value of the detected sub-frame. For example, the controller 330 may determine the time offset (or BHTP timing error) based on the index and the identification value of the detected sub-frame, a jitter, and an RTD between the satellite 100 and the ground station 200 in a time from a transmission time of the network synchronization-dedicated SF to a reception time of the network synchronization-dedicated SF.

The controller 330 may synchronize the BHTPs based on the time offset. For example, the controller 330 may synchronize the BHTPs based on the time offset in an initial network synchronization process and fine-tune the BHTPs based on the time offset in a network synchronization reacquisition process. BHTP synchronization may refer to a coarse synchronization acquisition and BHTP fine-tuning may refer to a precise synchronization acquisition.

Also, the controller 330 may track an out-of-sync of the synchronization-acquired BHTP based on a variable dummy frame and dummy symbols included in an SF for data transmission.

The controller 330 may transmit (or send) a plurality of data frames including data to the satellite 100 through the transceiver 310 based on the synchronization-acquired BHTP.

The plurality of data frames may be SFs for data transmission.

Thereafter, the controller 330 may track the out-of-sync of the synchronization-acquired BHTP based on a variable dummy frame and a dummy symbols included in a data frame received through a BSW allocated to the ground station 200 among the plurality of data frames.

For example, the controller 330 may set a sum of a symbol length of the dummy symbols and a symbol length of the variable dummy frame to be an acceptable out-of-sync value. The acceptable out-of-sync value may be a reference for determining whether the synchronization-acquired BHTP is out of synchronization.

The controller 330 may determine whether the synchronization-acquired BHTP is out of synchronization based on the acceptable out-of-sync value.

When the synchronization-acquired BHTP is out of synchronization, the controller 330 may perform a process of synchronizing BHTPs using the network synchronization-dedicated SF.

Figure 14:
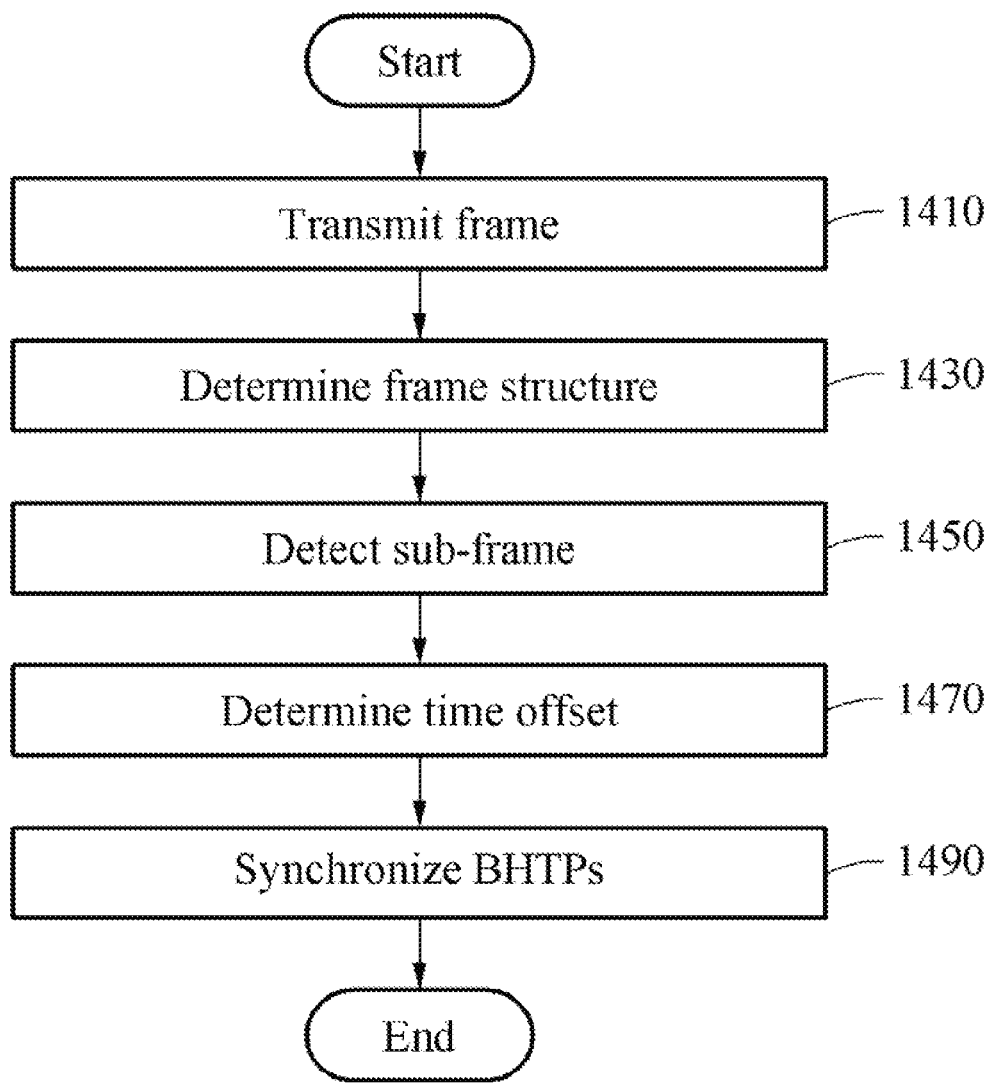
FIG. 14 is a flowchart illustrating an operation of the gateway of FIG. 10.

FIG. 14 is a flowchart illustrating an operation of the gateway of FIG. 10.

In operation 1410, the controller 330 may transmit a plurality of frames corresponding to a network synchronization-dedicated SF to the satellite 100.

In operation 1430, the controller 330 may determine whether a frame received through a BSW allocated to the ground station 200 among the plurality of frames is a network synchronization-dedicated SF configuration.

In operation 1450, the controller 330 may detect at least one sub-frame from a plurality of sub-frames included in the received frame when the received frame is the network synchronization-dedicated SF configuration.

In operation 1470, the controller 330 may extract an index and an identification value of the detected sub-frame and determine a time offset (or a BHTP timing error) between the satellite 100 and the ground station 200 based on the extracted index and identification value.

In operation 1490, the controller 330 may synchronize BHTPs based on the time offset.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a communication apparatus of a ground station comprising:
  transmitting, by the communication apparatus, a plurality of frames to a satellite based on a beam hopping time plan (BHTP) of the satellite and the ground station; and
  synchronizing, by the communication apparatus, the BHTP based on an index of a frame received through a beam switching window (BSW) allocated to the ground station among the plurality of frames transmitted by beam hopping by the satellite, and an identification value indicating at least one sub-frame included in the frame.

2. The communication method of claim 1, wherein the synchronizing to comprises:
  determining whether the frame is a network synchronization-dedicated super frame (SF) structure for synchronizing the BHTP;
  extracting, when the frame is the network synchronization-dedicated SF structure, an index and an identification value of a sub-frame detected from a plurality of sub-frames included in the frame;
  determining a time offset between the satellite and the ground station based on the index and the identification value of the detected sub-frame; and
  synchronizing the BHTP based on the time offset.

3. The communication method of claim 2, wherein the frame includes the plurality of sub-frames and dummy symbols corresponding to a protection section required in BSW transition.

4. The communication method of claim 2, wherein each of the plurality of sub-frames includes a start of super frame (SOSF), a super frame format indicator (SFFI), and a counter field in which an identification value of the corresponding sub-frame is stored.

5. The communication method of claim 4, wherein the SOSF of each of the plurality of sub-frames includes a same frame index.

6. The communication method of claim 4, wherein the SFFI includes SF format information indicating that the frame is the network synchronization-dedicated SF structure for synchronizing the BHTP.

7. The communication method of claim 4, wherein the counter field includes a first bit representing a total number of frames of the plurality of frames and a second bit representing an identification value of the corresponding sub-frame.

8. The communication method of claim 1, further comprising:
transmitting a plurality of data frames including data to the satellite based on a BHTP of which a synchronization is acquired,
wherein each of the plurality of data frames includes fixed dummy symbols and a variable dummy frame, and the dummy symbols and the variable dummy frame determine a beam switching time interval required in BSW transition in a frame structure of each of the plurality of data frames.

9. The communication method of claim 8, wherein the variable dummy frame is changed to determine the beam switching time interval using one of a plurality of bundle frames included in a data field of each of the plurality of data frames.

10. The communication method of claim 9, wherein number information of the variable dummy frame is included in PLS or P2 included in the data field.

11. A communication apparatus of a ground station comprising:
a transceiver configured to transmit a plurality of frames to a satellite based on a beam hopping time plan (BHTP) of the satellite and the ground station; and
a controller configured to synchronize the BHTP based on an index of a frame received through a beam switching window (BSW) allocated to the ground station among the plurality of frames transmitted by beam hopping by the satellite, and an identification value indicating at least one sub-frame included in the frame.

12. The communication apparatus of claim 11, wherein the controller is configured to determine whether the frame is a network synchronization-dedicated super frame (SF) structure for synchronizing the BHTP, extract an index and an identification value of a sub-frame detected from a plurality of sub-frames included in the frame when the frame is the network synchronization-dedicated SF structure, determine a time offset between the satellite and the ground station based on the index and the identification value of the detected sub-frame, and synchronize the BHTP based on the time offset.

13. The communication apparatus of claim 12, wherein the frame includes the plurality of sub-frames and dummy symbols corresponding to a protection section required in BSW transition.

14. The communication apparatus of claim 12, wherein each of the plurality of sub-frames includes a start of super frame (SOSF), a super frame format indicator (SFFI), and a counter field in which an identification value of the corresponding sub-frame is stored.

15. The communication apparatus of claim 14, wherein the SOSF of each of the plurality of sub-frames includes a same frame index.

16. The communication apparatus of claim 14, wherein the SFFI includes SF format information indicating that the frame is the network synchronization-dedicated SF structure for synchronizing the BHTP.

17. The communication apparatus of claim 14, wherein the counter field includes a first bit representing a total number of frames of the plurality of frames and a second bit representing an identification value of the corresponding sub-frame.

18. The communication apparatus of claim 11, wherein the controller is configured to transmit a plurality of data frames including data to the satellite based on a BHTP of which a synchronization is acquired, each of the plurality of data frames includes fixed dummy symbols and a variable dummy frame, and the dummy symbols and the variable dummy frame determine a beam switching time interval required in BSW transition in a frame structure of each of the plurality of data frames.

19. The communication apparatus of claim 18, wherein the variable dummy frame is changed to determine the beam switching time interval using one of a plurality of bundle frames included in a data field of each of the plurality of data frames.

20. The communication apparatus of claim 19, wherein number information of the variable dummy frame is included in PLS or P2 included in the data field.

* * * * *